United States Patent [19]

Grant et al.

[11] Patent Number: 4,786,834
[45] Date of Patent: Nov. 22, 1988

[54] STATOR ASSEMBLY FOR DYNAMOELECTRIC MACHINE

[75] Inventors: James J. Grant, Schenectady; William H. Miller, Albany; Edward C. Hartung, Clifton Park, all of N.Y.

[73] Assignee: REM Technologies, Inc., Albany, N.Y.

[21] Appl. No.: 69,887

[22] Filed: Jul. 6, 1987

[51] Int. Cl.$^4$ .................. H02K 3/04; H02K 19/24
[52] U.S. Cl. .................... 310/194; 310/259; 310/171; 310/54; 310/168
[58] Field of Search ............. 310/54, 60 A, 60 R, 310/166, 168, 171, 184, 194, 254, 259

[56] References Cited

U.S. PATENT DOCUMENTS

| | | | |
|---|---|---|---|
| 437,501 | 9/1890 | Mordey | 310/168 |
| 2,159,695 | 5/1939 | Gorham | 310/211 |
| 2,519,097 | 8/1950 | Allen | 310/168 |
| 3,192,958 | 10/1975 | Steen | 310/168 |
| 3,241,111 | 3/1966 | Sandstrom | 310/42 |
| 4,385,251 | 5/1983 | Mallick et al. | 310/178 |

Primary Examiner—Mark O. Budd
Assistant Examiner—Judson H. Jones
Attorney, Agent, or Firm—Heslin & Rothenberg

[57] ABSTRACT

An adjustable speed inductor type rotating dynamoelectric machine, capable of high speed operation, employs a stator assembly incorporating a spool-like support structure. A central, generally cylindrical portion of the support structure supports field windings while radially oriented end portions of the spool-like structure mount and accurately position a circumferentially distributed plurality of C-shaped armature core elements. Radially directed, angularly spaced grooves in the outer surfaces of the end portions receive legs of the C-shaped armature elements and serve to precisely position these elements in three orthogonal directions. The central portion of the armature-field winding support structure may be made of electrically conductive material to provide a flux shield and dissipate heat. For additional ventilation, cooling ports may be provided in the central portion of the spool-like support which cooperate with extended recesses in a coaxial rotor. The rotating rotor centrifugally propels cooling fluid through said ports into the spaces occupied by the field windings and armature windings.

25 Claims, 6 Drawing Sheets

STATOR ASSEMBLY FOR DYNAMOELECTRIC MACHINE

BACKGROUND OF THE INVENTION

1. Technical Field

This invention relates generally to dynamoelectric machines and more specifically to a stator assembly for inductor type rotating dynamoelectric machines capable of operating over a wide speed range, including high speeds.

2. Background Art

Adjustable speed drives conventionally employ general purpose motors that are selected from standard designs based on such characteristics as low reactance, the ability to operate over a given speed range, and heat rejection capability at the anticipated operating speeds. This approach results in usable designs, but also notable limitations, particularly in speed capability and overall system performance.

For high speed applications, dynamoelectric machines of various known constructions have been tried but with limited success. Synchronous and induction type motors, for example, are mechanically limited at high speeds due to the lack of physical integrity of the rotating structure (which includes the shaft, pole pieces and field winding) at high rotational speeds. This has resulted in few applications of the induction type machine above 3600 rpm. Gears can, of course, be used to multiply the output speed of the standard induction motor but this has not proven particularly reliable at higher multiplication factors. Further, there are limits with respect to how much one can "gear up".

In other high speed applications, a small, "universal" type motor or a permanent magnet motor have been employed. However, the universal type motor is not especially efficient and is difficult to scale up. The permanent magnet motor, on the other hand, is not very cost effective and is also impractical for large machines. Variable-reluctance type machines (with no field winding), have recently been proposed for certain applications, but generally use laminated rotors which tend to come apart at high speeds.

Another attempt to realize high speed operation, particularly for electrical generation, employs an inductor type dynamoelectric machine. Such machines are generally characterized by a stator which includes both AC armature and DC excitation coils, surrounding a coil-less rotor. Since there are no rotating field or armature coils in this type of dynamoelectric machine, slip rings, brushes and associated connections, common to machines having rotating windings, may be entirely eliminated. This feature, coupled with the typical solid construction of the machine rotor, makes the inductor machine particularly adaptable to high rotational speed applications.

One known version of an inductor type rotating dynamoelectric machine, employs a circumferentially distributed arrangement of "C" or "U" shaped armature elements surrounding a generally cylindrical field coil which in turn encloses a transverse pole magnetic rotor. U.S. Pat. No. 437,501 to W. M. Mordey, for example, describes an "Electric Generator" having a stator assembly which employs a stationary cylindrical field coil, and "U" shaped magnetic pieces alternately disposed and oppositely directed on opposite sides of a single armature coil. In the Mordey arrangement, the U-shaped magnetic pieces and single armature coil are carried by bolted together side frames. The field winding is held stationary by straps encircling the winding; the ends of the straps are attached to longitudinal rods extending between the side frames (reference FIG. 3 of the Mordey patent and the description thereof).

U.S. Pat. No. 2,519,097 to F. J. Allen describes an inductor type dynamoelectrical machine which also employs a circumferentially distributed arrangement of arch or U-shaped armature elements enclosing a stationary field winding and a rotatable transverse pole rotor. As in the Mordey patent, the armature elements of Allen are mounted to an external frame. A more recent version of this dynamoelectric machine configuration, is illustrated in U.S. Pat. No. 3,912,958 for a "Flux-Switched Inductor Alternator" issued to D. B. Steen. Although the details of mounting the stator assembly are not fully depicted or described in the Steen patent, in one embodiment (i.e. FIG. 3) the plurality of circumferentially distributed stator bars are mechanically connected to a thermomagnetic flux ring at one end of the stator assembly which serves to support the bars.

Although the above described prior implementations of inductor type machines are capable of high speed operation, they suffer from certan practical limitations. Each appears to be directed primarily at electrical generation. It would, of course, be desirable to configure such a machine so that it is suitable for operation in all four quadrants, i.e. generation, motoring, forward and reverse. Further, to optimize machine operation, it is highly desirable to be able to readily precisely position the various armature elements, axially, radially and circumferentially, and to maintain said precise positioning and associated critical inter-component spacing during machine operation. The external mounting arrangements of the prior art do not effectively achieve this objective and also complicate the assembly, disassembly and repair of the machine. Further refinements in cooling such machines during operation and in providing enhanced flux shielding are also desirable.

SUMMARY OF THE INVENTION

These needs are realized, and the shortcomings of the prior art overcome, in accordance with the principles of the present invention, by the provision of a spool-like structure for supporting the stator of such an inductor type rotating dynamoelectric machine. The spool-like support structure provides interior support for field windings and mounts and accurately positions a plurality of circumferentially distributed C-shaped armature elements in three orthogonal directions. The spool-like structure is made of nonmagnetic material and has a hollow, elongated central portion extending concentrically about a longitudinal axis. This central portion supports a field coil and defines an interior longitudinal passageway for accommodating the insertion of a coaxial rotor. At each end of the central portion, end portions extend radially outward therefrom. Each of these end portions supports a plurality of armature core positioning elements disposed, respectively, at angularly spaced locations thereon. In a preferred construction, each of the armature core positioning elements comprises a radially oriented groove in the axially outermost surface of an end portion. The grooves are configured to receive and orient leg portions of generally C-shaped armature core elements arrayed in a circumferentially distributed arrangement about the periphery of the spool-like structure. The end portions of the spool-like structure are axially spaced and radially dimensioned, and the grooves in each end portion are angularly spaced so as to precisely position the armature elements in three orthogonal direction and to maintain the radially innermost ends of said armature core elements equidistant from the longitudinal axis and separated from the radially innermost ends of adjacent core elements.

For cooling purposes, the central portion of the spool-like structure may be provided with cooling ports near the ends thereof which advantageously communicate with extended recesses in the surface of a rotor mounted for rotation in the passageway defined by the central portion. In this embodiment, the rotor acts as an impeller and centrifugally propels cooling fluid through said cooling ports. Prefereably, the central portion of the spool-like structure is made of electrically conductive material which suppresses time varying flux within the rotor and also facilitates heat dissipation.

The invention further contemplates: additional flux shielding between adjacent armature core elements; means for clamping or otherwise securing the armature core elements to the end portions of the spool-like structure to reduce element vibration and noise; knurling of rotor lobe surfaces to reduce eddy current losses and enhance cooling; the use of a rotor position encoder for providing a feedback signal to facilitate synchronous operation; the interference fitting of a stator assembly mounted on the spool-like structure within frame means to simplify machine assembly, disassembley and repair; and the construction of unique stator assemblies and improved adjustable speed and/or high speed dynamoelectric machines incorporating said spool-like support structure.

Accordingly, a principle object of the present invention is to provide an inductor type dynamoelectric machine of improved construction, utility and versatility.

Another object is to provide an inductor type dynamoelectric machine capable of operation over a wide speed range, including very high speeds, and exhibiting enhanced efficiency, structural integrity, reliability, repariability, and cost effectiveness.

A further object is to improve the flux shielding and ventilation of an inductor type dynamoelectric machine.

Yet another object is to provide a practical, stable, affordable inductor type dynamoelectric machine capable of effectively operating in four quadrants.

A further object is to provide a dynamoelectric machine capable of operating at high temperatures.

A still further object is to provide a highly reliable design for an inductor type rotating dynamoelectric machine which facilitates internal mounting and precise positioning of stator elements and also permits the incorporation of fluid cooled windings without the need for rotating seals.

Another object is to provide a stator assembly for an inductor type rotating dynamoelectric machine which is compact, self supporting, relatively easy to assemble and also exacting in locating stator components.

A further object is to provide a stator support whch is readily manufactured, ensures precise positioning of circumferentially distributed C-shaped armature elements, and facilitates flux shielding and cooling fluid circulation in an inductor type dynamoelectric machine.

A still further object is to provide a stator support for an inductor type dynamoelectric machine which support affords armature core positioning, coulomb damping, field winding support, reduced flux leakage, cooling, and enables the use of thin laminations as the armature elements which in turn reduces losses at high frequencies.

BRIEF DESCRIPTION OF THE DRAWINGS

These and other objects, advantages and features of the present invention will be more readily understood from the following detailed description, when considered in conjunction with the accompanying drawings in which.

DETAILED DESCRIPTION

Figure 1:
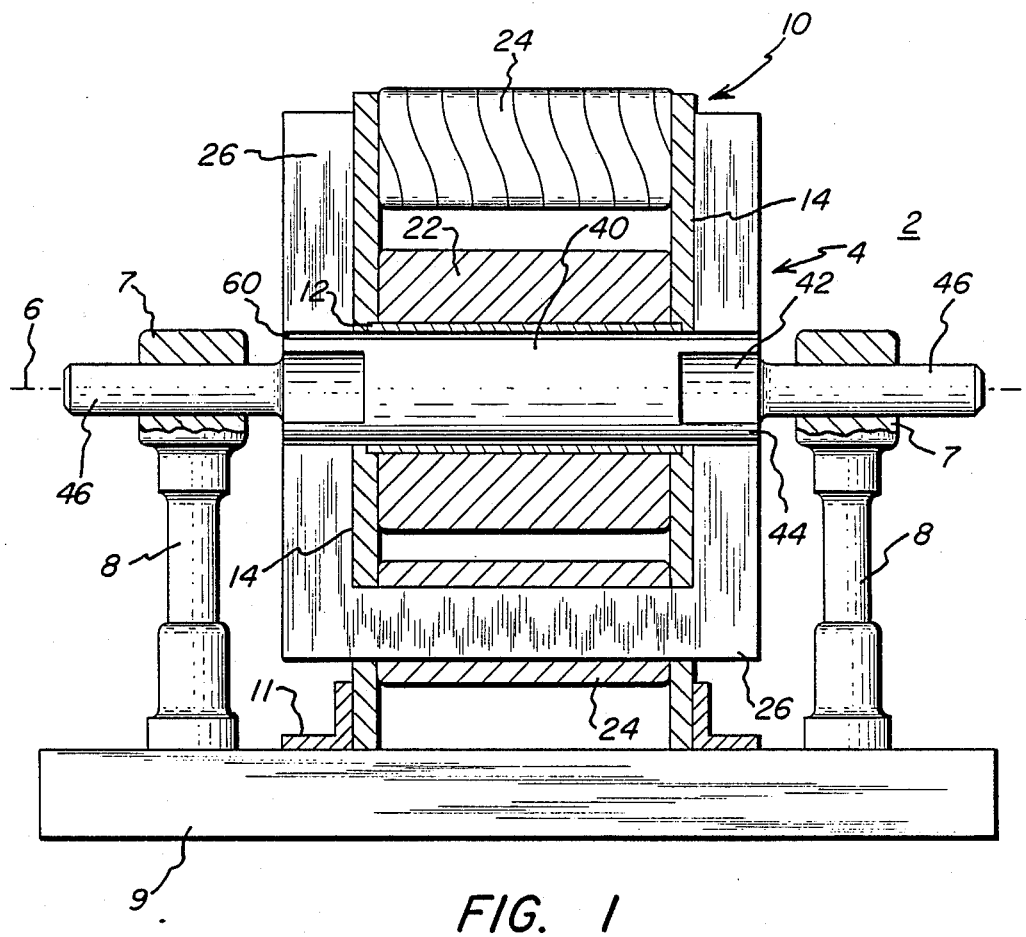
FIG. 1 is a cross-sectional view from the side of one embodiment of an inductor type dynamoelectric machine having a stator assembly constructed in accordance with the principles of the present invention.

Referring now to FIG. 1, a first embodiment of a transverse-pole AC inductor type rotating dynamoelectric machine, constructed in accordance with the principals of the present invention, is shown. The machine, generally denoted 2, includes a stationary stator assembly 4 surrounding a rotatable, coil-less rotor 40. In this simplified embodiment, the machine is shown without a surrounding housing or frame to emphasize the internal nature of the stator support.

Rotor 40 extends along and is coaxial with a longitudinal axis 6. The rotor preferably has a solid one piece construction and is supported by bearings 7, at each end of rotor shaft 46. In this simplified embodiment, bearings 7 are mounted on pedestals 8 which, in turn, are supported by a base member 9. Rotor 40 has a central cylindrical portion 41 provided with circumferentially spaced, axially extending surface recesses or cutouts 42 at the ends thereof, which define a desired number of lobes 44 at each end of the transverse pole rotor, in a manner known in the art. The rotor can be constructed of any available magnetic material, for example, carbon steel.

Stator assembly 4 includes an internal spool-like support structure 10 resting on base member 9 and secured thereto, if desired, by brackets 11, or other suitable means. The spool-like structure 10 has a central, generally cylindrical portion 12 which is coaxial with longitudinal axis 6 and defines an interior, longitudinally extending, central passageway for receiving rotor 40. Field (or DC excitation) windings 22 are coiled about and supported by the exterior surface of central portion 12.

Stator support structure 10 also includes a pair of end portions 14 extending radially outward from the ends of central portion 12. As more fully described hereinafter, end portions 14 serve to mount and precisely position a plurality of circumferentially distributed C-shaped (also referred to as U or arch shaped) armature core elements 26. Each armature core element 26 is preferably provided with an individual AC armature coil 24, coiled about and supported by a longitudinally extending base portion of the core element. Armature core elements 26 are made of magnetic material while support structure 10 is composed of nonmagnetic material, for example, aluminum or a phenolic.

Operation of machine 2 is typical of any synchronous AC machine in that, if electric current is applied to the field windings 22, and the rotor 40 is rotated by some external means, voltages will be induced in the armature windings 24 in the manner of a generator. Similarly, if the armature windings are energized in such a fashion as to produce a rotating flux wave at the gap 60, which exists between the radially innermost ends of armature elements 26 and the rotor lobe surfaces 44, as is done in polyphase, AC synchronous machines, the rotor 40 of the machine will be urged to follow the armature flux wave and rotate in the manner of an electric motor.

Figure 2:
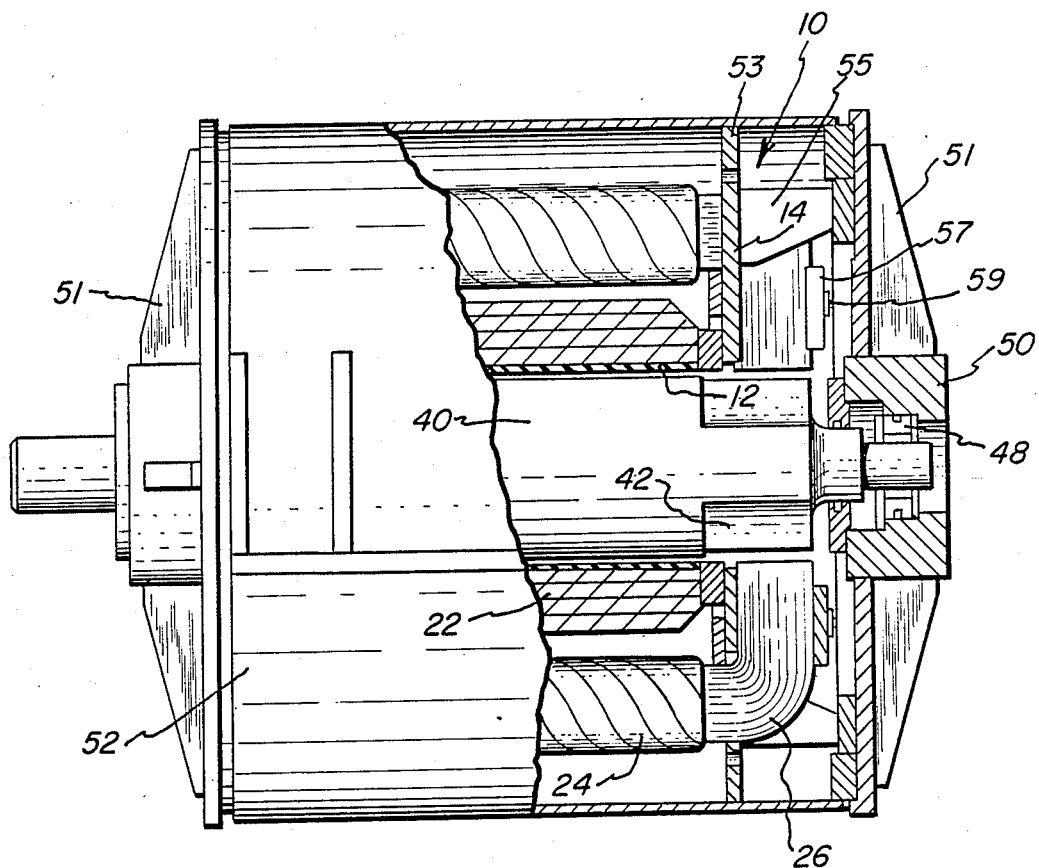
FIG. 2 is a partially broken away cross-sectional view from the side of another embodiment of an inductor type dynamoelectric machine constructed according to the principles of the present invention.

FIG. 2 depicts another embodiment of an inductor type rotating dynamoelectric machine incorporating the unique spool-like stator support structure 10 of the present invention. In this figure, as in all of the figures, like elements are identified by like reference numbers and function in like manner. In this particular embodiment, rotor 40 is rotatably supported by a pair of bearings 48. The bearings, in turn, are supported by bearing mounts 50 in end shields 51. End shields 51 are attached, in any known manner, to a frame 52 which surrounds the stator assembly. The stator assembly is supported within frame 52 by the spool-like structure 10 and is preferably centered within frame 52, radially, by end portion extensions or spokes 53 and axially by spacers 55. In a preferred construction, the stator assembly is interference fit within frame 52 permitting ready assembly, disassembly and repair thereof.

The embodiment of FIG. 2 also includes an annular ring 57 disposed circumferentially along the outer edge of the radial protrusions of armature core elements 26. Ring 57 may be connected by bolts 59, or the like, to end portions 14 for purposes of clamping the armature core elements 26, in their predetermined positions, to support structure 10. Other suitable securing means may also be used for this purpose.

Also, as depicted in FIG. 2, recesses 42 of rotor 40, preferably extend axially inward beyond end portions 14 of stator support 10. As described more fully hereinafter, the central portion 12 of the spool-like support structure 10 can advantageously be provided with cooling ports extending therethrough, near the ends of central portion 12. Rotor 40, with its extended rotor recesses 42, acts as an impeller centrifugally propelling cooling fluid through the cooling ports in central portion 12 of the stator support, thereby improving machine cooling, which is particularly important in high speed applications.

Figure 3:
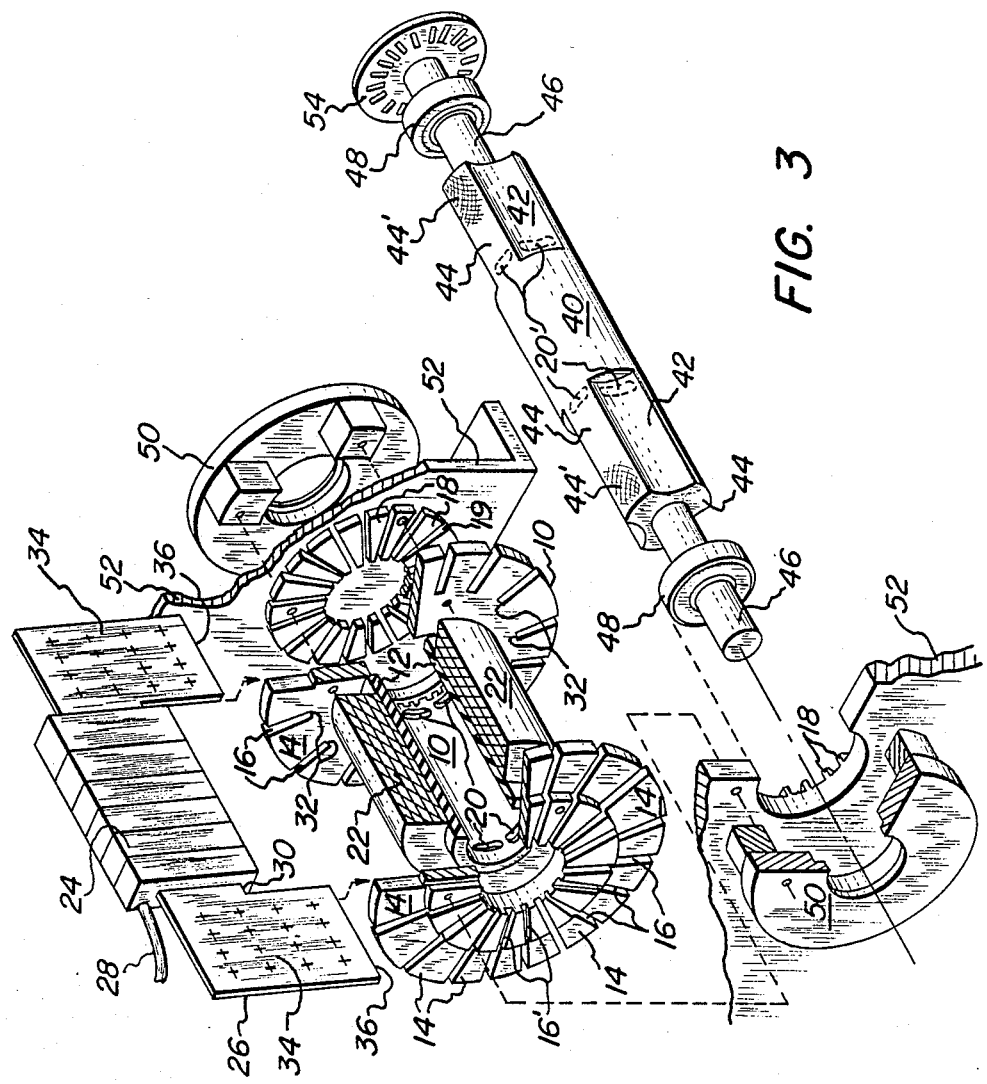
FIG. 3 is an exploded isometric view of another embodiment of the present invention.

FIG. 3 is a simplied, exploded isometric illustration of a typical implementation of the present invention and is particularly useful in understanding the interrelationship of component parts. As shown, the spool-like structure 10 which supports field windings 22 and armature core elements 26, comprises a hollow cylindrical body 12 having disc-like ends 14. End portions 14 contain a plurality of peripheral slots 16 which extend radially inward from the periphery of the end portion to shoulders 32. Dados or grooves 16' extend radially inward from shoulders 32 at the bottom of slots 16 along the outer surface of each end portion 14. Slots 16 in conjunction with grooves 16' serve to mount, orient and precisely position armature core elements 26.

Armature windings 24 are individually placed on the base portions of C-shaped core elements 26 and are electrically connected by leads 28. For clarity of illustration, only one armature core element 26 is depicted in FIG. 3. In practice, a plurality, e.g. eighteen, of such armature cores are mounted in the angularly spaced grooves 16' in the end plates of the spool-like support structure 10. During assembly, the plurality of core elements 26 are inserted in the spool end slots 16 so that the armature winding-free portions 30 of the bases of core elements 26 rest on the shoulders 32 of slots 16. The legs 34 of the core elements slide into the radial slot extensions, i.e. grooves 16' and when all elements are so installed, their radially innermost ends 36 form approximately a circular locus which is concentric with the rotor 40 installed coaxially within the body portion 12 of the spool-like structure.

In the embodiment of FIG. 3, a set of partitions 18, which are shown as part of frame 52, define a matching set of grooves 19 for receiving the axially outermost edges of C-core elements 26. The partitions 18 and associated end members of frame 52 comprise a clamping means for securing C-shaped core elements 26, in their mounted, radially, axially and circumferentially correct positions, to end portions 14 of the spool-like support structure 10. Such clamping serves to abate core element vibration and noise.

Support structure 10 may be made of one piece or constructed as individual parts secured together, in any known fashion. The central generally cylindrical portion 12 of the support structure is preferably provided with a set of circumferentially spaced, arcuate cooling ports 20 at each end thereof. Ports 20 extend through the wall of central portion 12 and allow communication of the hollow space within body 12 with the spaces reserved for field windings 22 and armature windings 24. The number, location, size and shape of ports 20 may vary from that illustrated in FIG. 3. The cooling operation involving ports 20 will be more fully described hereinafter in conjunction with FIG. 4.

The rotor 40 comprises a unitary cylinder of magnetic material, the ends of which are provided with cutouts or recesses 42 giving rise to a plurality of lobes 44 located between said recesses. The magnitude of eddy currents induced in the rotor lobes 44 under the core element ends 36 by the action of interlinked alternating or pulsating flux may be reduced, in accordance with an optional aspect of the present invention, by a machining process known as knurling. In this process, the original smooth surface of the rotor lobes 44 is transformed, using a knurling tool, into numerous small raised regions 44'. These regions limit the size of the eddy current which can flow in the outer surface of the rotor lobes 44, thereby producing lower $I^2R$ losses in the rotor surface. The magnitude of the eddy current is coupled with the skin effect and both mechanisms are known to become stronger as the applied frequency of the pulsating flux is increased.

The knurling of rotor lobe surfaces further provides an adjunct method of cooling. The knurling increases the surface area of the lobes and therefore allows cooling to take place more readily.

As shown in the lower part of FIG. 3, rotor 40 has an integral, contiguous and coaxial rotor shaft 46 extending longitudinally from each end of rotor 40. Disposed about each end of shaft 46 are a set of bearings 48, which, when disposed in bearing mounts 50, rotatably support rotor 40 coaxially within the hollow passageway defined by body portion 12. Recesses 42 of the rotor 40 extend axially inward sufficiently to ensure that the recesses overlap with cooling ports 20, as schematically illustrated in relationship to the rotor by the phantom ports 20'.

In many applications, a machine frame 52 is employed having spool end, abutting members. In such instances, segments 18 can be formed as an integral part of the machine frame 52. Such an arrangement would allow the bearing support means 50 to be bolted to the outside face of the end members of frame 52 with bolts passing through and secured to the end portions 14, or in the alternative, passing through said end portions, and secured to the opposite bearing support means. The clamping together of the radially aligned parts serves to fix C-shaped core elements 26 into their radially equidistant, circumferentially spaced arrangement, as well as to reduce C-core element vibration and noise. Finally, rotor shaft position determining means 54, e.g. an optical encoder disk, may be located on an extension of shaft 46 or immediately inside of bearings 48, to provide, in a manner well known in the art, a feedback signal for facilitating synchronous operation of the machine.

Figure 4:
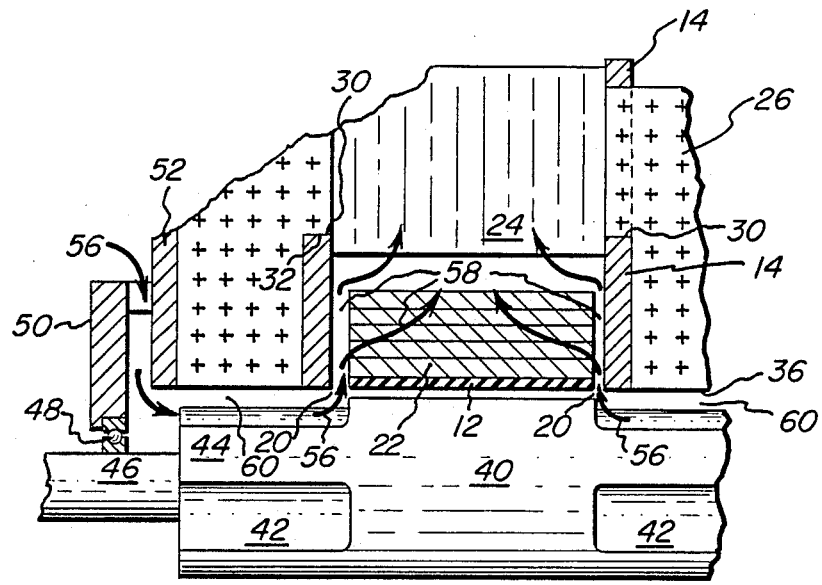
FIG. 4 is a cross-sectional fluid flow diagram useful in understanding a ventilation feature of the present invention.

FIG. 4 is a simplified, partial cross section of the embodiment shown in FIG. 3, taken between adjacent core elements 26. The path of cooling fluid 56 is clearly illustrated as it enters between bearing support 50 and frame 52. The point of entry of the cooling fluid may vary from that shown; for example, perforations could be provided in the bearing support 50 for the induction of fluid therethrough.

After initial induction, the cooling fluid 56 traverses the recesses 42, moving axially inward, and is then centrifuged by the rotating rotor 40 through ports 20 and into the vicinity of field windings 22 and armature windings 24. The field windings 22 are preferably coaxially wound around the exterior surface of the cylindrical body 12 and so arranged as to establish fluid passages 58 about and within the field coil itself. In this view, there is also clearly depicted the gap 60 which is established between the outer circumferential surfaces of the rotor lobes 44 and the generally circular locus of the radially innermost ends 36 of the C-shaped core elements. The radial extent of this gap is typically on the order of 20-50 mils, depending upon the size of the machine. The stator assembly of the present invention serves to maintain this spacing, within tight tolerances, during machine operation.

In this embodiment, the armature C-shaped core elements are similar to conventional "C" cores used in many modern transformer applications. The armature elements may be constructed of individual laminations, of wrapped construction, of iron powder (sintered) construction or otherwise. The outer lamination of each core element 26 may be made of copper or other similar material, particularly near the radially innermost ends of the core elements, to provide additional interelement flux shielding. Alternatively, a separate thin plate of copper or other suitable material, or equivalent structure, may be used to provide such interelement flux shielding.

Figure 5:
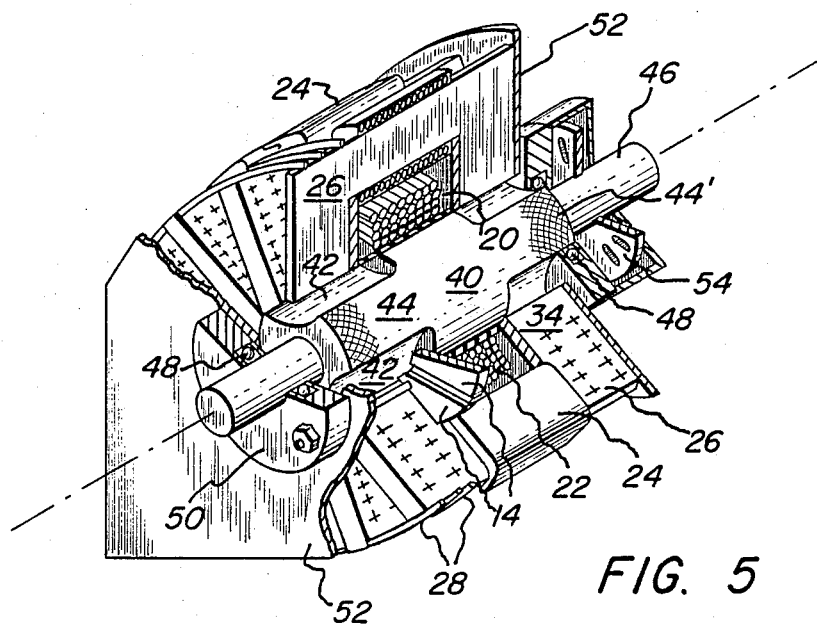
FIG. 5 is an isometric cut-away depiction of the dynamoelectric machine of FIG. 3 in assembled form.

FIG. 5 is a simplified isometric cut-away view showing the assemblage of the components depicted in FIG. 3. The circumferential distribution of armature core elements 26 is clearly shown in this figure.

Figure 6:
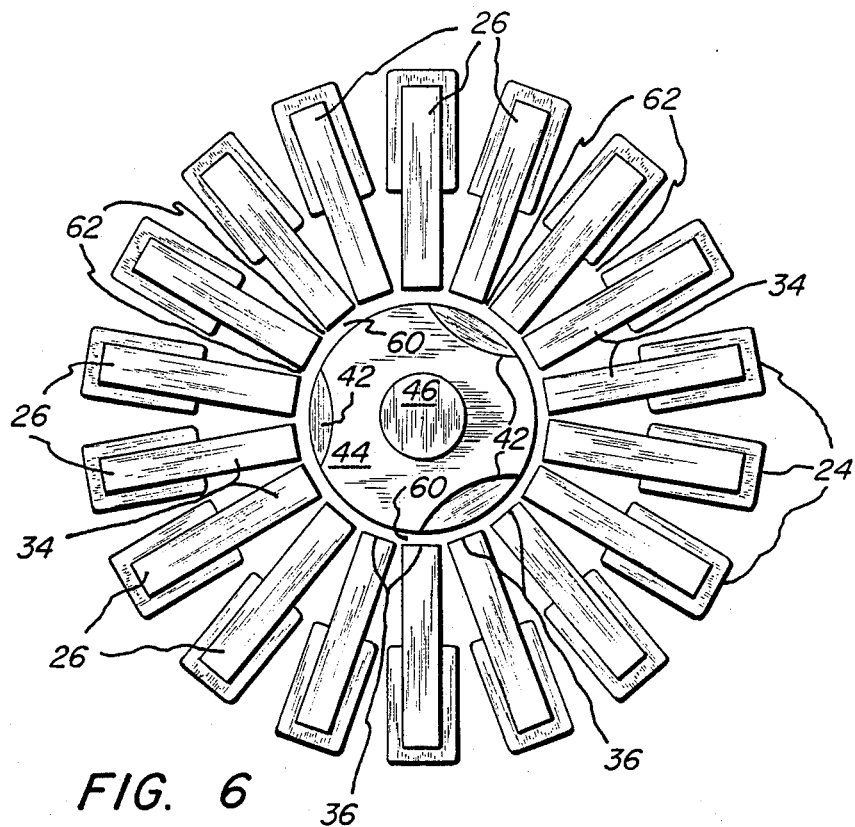
FIG. 6 is a cross-sectional end view of magnetic componentry of a machine constructed in accordance with the principles of the present invention.

FIG. 6 is an end view of only the magnetic components of the invention. As shown, the C-shaped core elements 26, when supported by the spool-like structure, are radially disposed and preferably equally angularly spaced. The radial depth to which elements 26 are seated is determined by the shoulders 32 of the respective armature mount slots 16. Rotor 40 is disposed centrally and coaxially within the array of C-core elements 26 giving rise to the desired rotor-armature gap 60. Another gap, referred to herein as the interelement gap 62, is effected by the specially constructed armature element mounting structure. This interelement gap 62 minimizes leakage of flux between adjacent elements and also allows the passage of cooling fluid between the armature core elements.

Figure 7:
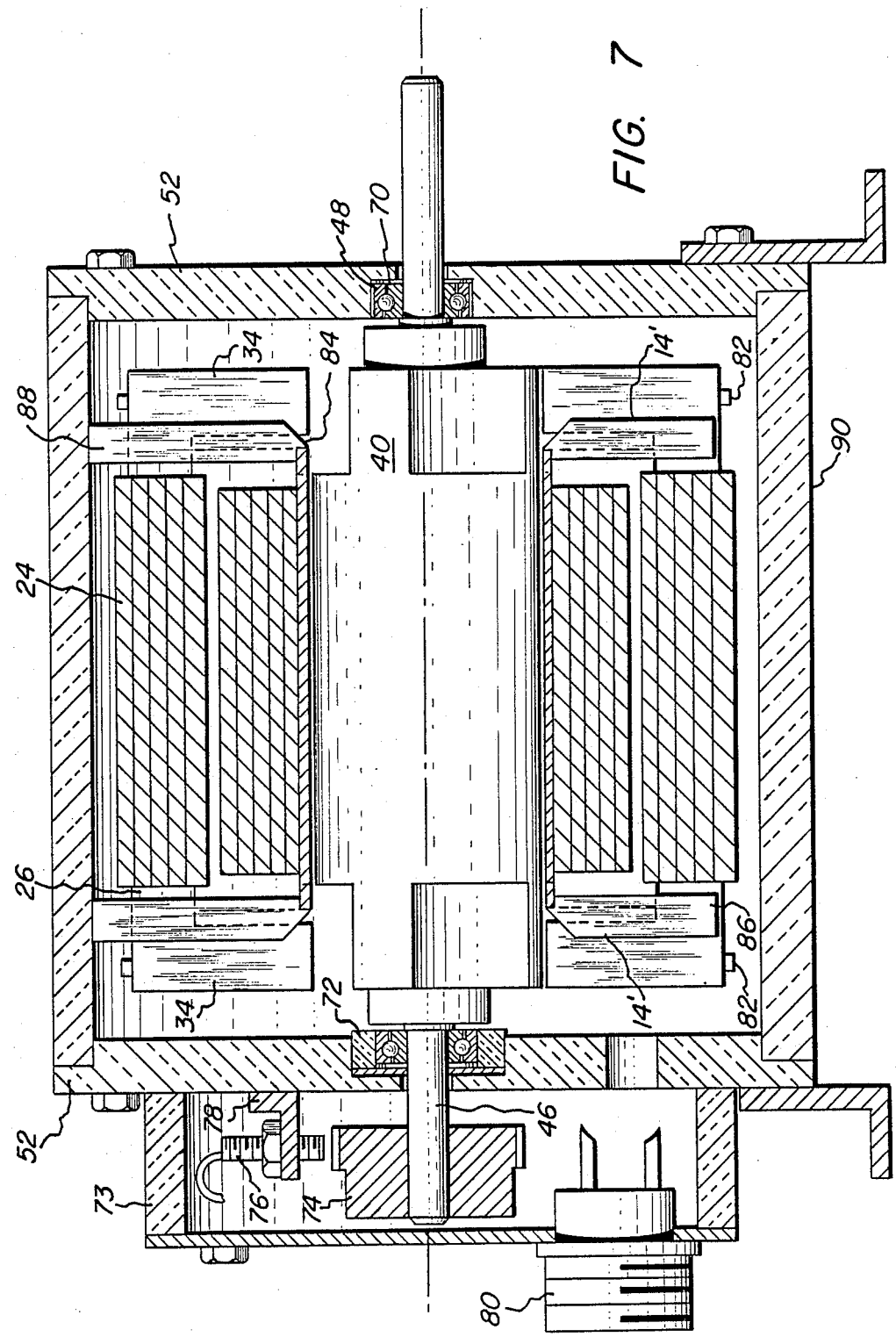
FIG. 7 is a cross-sectional view from the side of still another embodiment of the present invention.

FIG. 7 shows further variations in an inductor type dynamoelectric machine constructed in accordance with the principles of the present invention. In this embodiment, rotor bearings 48 are mounted directly in the end walls of frame 52. Wave washers 70 preload the bearings and allow for thermal expansion. Insulated bearing mount 72 separates one end of the rotor from a frame extension 73. Located within frame extension 73 is a rotor position encoder in this case, comprising a gear 74 secured to the end of rotor shaft 46 operating in conjunction with magnetic pick up 76 mounted to an end wall of frame 52 by a bracket 78, or the like. Frame extension 73 also supports an electrical connector 80 for powering the electrical components of the machine.

Referring still to FIG. 7, bands 82 circumferentially wrap around the radially outermost ends of legs 34 of armature core elements 26. Bands 82 can be employed to secure the armature core elements in place on the spool-like support structure either permanently, or provisionally, if another permanent fastening approach e.g. vacuum pressure impregnation, is used.

Figure 8:
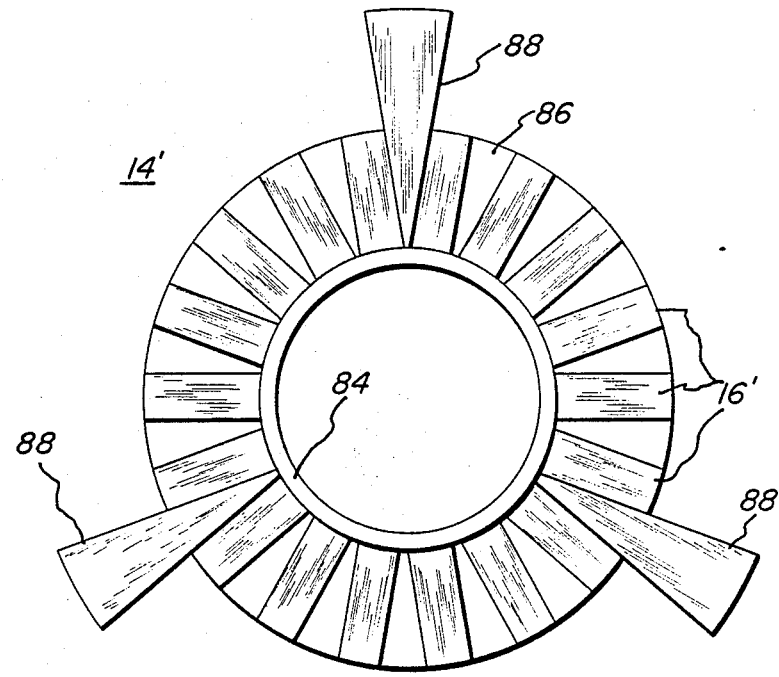
FIG. 8 is a cross-sectional end view of the end portion of a stator support used in the embodiment of FIG. 7.

In the embodiment of FIG. 7, the radially innermost ends of the end portions 14' are chamfered as shown at 84, to improve efficiency. As best seen in the end view of FIG. 8, each end plate 14' of the spool-like support structure has three equally spaced, radial extensions or spokes 88 for centering the stator assembly within generally cylindrical housing 90. In the six pole implementation depicted, extensions 88 are separated from each other by two pole pitches which equal 360 electrical degrees. This arrangement allows the end portions 14' to be made of the same conductive material as the central portion of the spool-like support structure.

The stator assembly is preferably interference fit within cylindrical casing 90. This can be accomplished by heating the casing so that it thermally expands before inserting the stator assembly and then allowing the casing to cool and shrink back into interference fit around the stator assembly. Such construction allows for ready assembly and disassembly of the machine as well as easy access to the components thereof.

In the embodiments depicted herein, each rotor lobe 44 has an arc length which spans one full magnetic pole pitch and gives rise to development of the desired torque characteristics. Optimally, the arc length of a rotor lobe should be less than or equal to a single magnetic pole pitch, but greater than one armature element. The rotor lobes and the associated recesses therebetween may, if desired, transverse the entire length of the rotor. The embodiments depicted herein illustrate a six pole-three phase configuration. Those skilled in the art will recognize that the present invention may be constructed to have any number of phases or any even number of poles, so long as each end of the rotor has half as many lobes as there are poles and the lobes at one end mirror those at the other end. It is desirable to use a low number of poles in order to be able to achieve high speed operation at reasonable electrical frequencies.

From the foregoing, it will be apparent that this invention provides a unique internally supported stator assembly for use in constructing an inductor type rotating dynamoelectric machine capable of efficient, high speed operation. When integrated as taught herein, the various components of the invention achieve all of the objects initially set forth herein. Although various embodiments have been described and depicted herein, it will be apparent to those skilled in this art that various modifications, additions, substitutions, etc. may be made without departing from the spirit of the invention, the scope of which is defined by the claims appended hereto:

What we claim is:

1. A stator assembly for a dynamoelectric machine, comprising:
    a non-magnetic spool-like structure having a hollow, elongated central portion, said central portion comprising wall means extending about and parallel to a centered longitudinal axis and defining a longitudinal passageway through said central portion for accommodating the insertion of a rotor in said passageway, said spool-like structure having axially spaced end portions that extend radially outward relative to said longitudinal axis from respective ends of said central portion, and a plurality of armature core positioning means disposed, respectively, at angularly spaced locations on each of said end portions;
    a field winding coiled about the central portion of said spool-like structure and adapted for connection to a source of direct current; and
    a circumferentially distributed plurality of generally C-shaped, longitudinally extending armature cores supported by the end portions of said spool-like structure, each of said armature cores being secured in position on the end portions of said spool-like structure by said armature positioning means such that each of said armature cores is precisely positioned axially, radially and circumferentially with respect to said longitudinal axis.

2. The stator assembly of claim 1 wherein said plurality of armature core positioning means are disposed, respectively, at angularly spaced locations around the axially outermost surface of each of said end portions, and wherein each of said armature cores is secured in position on the end portions of said spool-like structure by a generally axially aligned pair of armature positioning means.

3. The stator assembly of claim 2 wherein said plurality of armature cores are disposed in a circumferential array about said longitudinal axis, and each of said cores has a base portion extending generally parallel to said axis and a projection at each end of said base portion extending generally radially inward; and
    wherein said plurality of positioning means comprises grooves in the axially outermost surface of each of said end portions of said spool-like structure, each groove extending radially inward from a shoulder associated with the groove and each groove being configured to receive and position a respective projection of an armature core therein when the base portion of said armature core rests upon the shoulder associated with said groove.

4. The stator assembly of claim 3 wherein the grooves in each end portion are angularly spaced so as to maintain a desired peripheral gap between radially innermost ends of projections of adjacent armature cores.

5. The stator assembly of claim 4 wherein the shoulders associated with said grooves are located so as to maintain the radially innermost ends of said armature core projections equidistant from said longitudinal axis.

6. The stator assembly of claim 5 further comprising securing means for securing said plurality of precisely positioned armature cores to the end portions of said spool-like structure.

7. The stator assembly of claim 6 wherein said securing means comprises means for clamping projections of said armature cores to an adjacent end portion of the spool-like structure.

8. The stator assembly of claim 6 wherein said securing means comprises means for circumferentially banding said plurality of armature cores.

9. The stator assembly of claim 5 wherein each of the end portions of said spool-like structure is further provided with a plurality of radially disposed spoke means extending beyond said shoulders for precisely positioning said stator assembly within a casing.

10. The stator assembly of claim 9 wherein the wall means of the central portion of the spool-like structure is made of electrically conductive material and acts to suppress time varying flux within the rotor.

11. The stator assembly of claim 5 further comprising a flux shield located between projections of adjacent armature cores.

12. The stator assembly of claim 5 wherein the wall means of the central portion of the spool-like structure contains cooling ports extending therethrough for connecting said passageway to the exterior of the central portion of said spool-like structure.

13. The stator assembly of claim 12 wherein said cooling ports comprise a set of circumferentially spaced arcuate ports located near and associated with each end of the central portion of the spool-like structure.

14. The stator assembly of claim 13 in combination with a rotor coaxially and rotatably mounted in the passageway, said rotor having at least two circuferentially spaced recesses therein extending axially from each end of the rotor at least to a position coterminous with the axially innermost edge of cooling ports associated with a corresponding end of said central portion of the spool-like structure, whereby the rotor when rotated serves to centrifugally propel cooling fluid outwardly through said cooling ports.

15. The apparatus of claim 14 further comprising rotor position encoding means for providing a rotor position feedback signal to facilitate synchronous rotor rotation.

16. The apparatus of claim 15 further comprising
    frame means for enclosing said stator assembly; and rotor mounting means connected to said frame means for rotatably mounting said rotor such that the rotor extends coaxially through said passageway.

17. The apparatus of claim 16 wherein said stator assembly is interference fit within said frame means and wherein said frame means can be removed from around said stator assembly without requiring any disconnection of the stator assembly from said frame means and without requiring any disassembly of said stator assembly.

18. A stator assembly for an inductor type dynamoelectric AC machine comprising:
a hollow non-magnetic armature-field winding support extending along and about a central longitudinal axis, said support having a plurality of axially spaced cooling ports therethrough, said support including means for mounting and precisely positioning armature core elements, a field winding on the support disposed between said axially spaced ports, and a plurality of generally C-shaped armature core elemetns mounted longitudinally on the support in circumferentially spaced relation.

19. The stator assembly of claim 18 in combination with a rotor coaxially and rotatably mounted in the hollow support, said rotor having cutouts extending axially from each end of the rotor, the cutouts communicating with said cooling ports and serving to centrifugally propel cooling fluid through said ports and into contact with the field windings and armature core elements during rotor rotation.

20. The apparatus of claim 19 wherein said support comprises a spool-like structure having a central cylindrical portion concentric with said axis, an exterior surface of said central portion supporting said field windings, said axially spaced cooling ports being located near respective ends of said central portion, said spool-like structure further comprising an end plate located at each end of said central portion and extending radially outward relative to said longitudinal axis from the exterior surface of said central portion, the end plates having radially extending grooves in the axially outermost surfaces thereof, said grooves being constructed so as to precisely position the plurality of armature core elements in three orthogonal directions.

21. The apparatus of claim 20 wherein said central portion of the spool-like structure comprises electrically conductive material.

22. In a stator assembly of an inductor type dynamoelectric machine having a plurality of stationary, generally C-shaped, longitudinally extending armature elements circumferentially distributed about a central longitudinal axis, and having a stationary field winding concentric with said axis and interior of said armature elements, the improvement comprising:
common support means for supporting said field winding and said armature elements from inside and for accurately postioning the armature elements.

23. The improved stator assembly of claim 22 wherein said support means comprises a non-magnetic spool type structure having end plates with radial grooves for receiving said armature elements.

24. An inductor type dynamoelectric machine comprising:
non-magnetic armature-field winding support means comprising a hollow spool, said spool having a central, generally cylindrical wall portion concentric with a longitudinal axis extending therethrough and an end portion extending radially outward from each end of said central portion, said central portion of said spool having at least one cooling port located near each end of said central portion and passing through said wall, each end portion having a plurality of radially extending grooves in an axially outermost surface thereof, said grooves being adapted to receive therein a corresponding plurality of C-core elements circumferentially distributed about a periphery of the spool by disposing one leg of a discrete C-core element into one of said grooves at one spool end and the other leg of the same element into a groove located at the other spool end, and further comprising securing means for holding the plurality of C-core elements so disposed;
a stator comprising a field winding coiled about the central portion of the spool and a plurality of C-core armature elements circumferentially distributed about said support means by the aforesaid insertion of core element legs into said grooves, and further comprising armature windings distributively disposed on said C-core elements, said circumferential distribution of C-core elements maintaining a desired gap between radially innermost ends of adjacent C-core elements and between said ends and said longitudinal axis; and
a unitary rotor of magnetic material disposed coaxially within said hollow spool, said rotor comprising an elongate, cylindrical body at each end of which are formed at least two lobes that are integral, concentric and contiguous with the cylindrical body of said rotor, said lobes being defined by recesses disposed therebetween of sufficient axial extent to communicate with said ports so that the rotor, when rotating, inducts cooling fluid at the rotor ends, draws said fluid inwardly along the rotor recesses and centrifuges said cooling fluid through said ports into contact with said field winding and C-core elements for cooling purposes; and
bearing means for rotatably mounting said rotor for rotation within said hollow spool.

25. The dynamoelectric machine of claim 24 wherein the central portion of said spool is comprised of electrically conductive material which acts as a central flux shield, and further comprising inter-element flux shielding located between adjacent C-core elements near the radially innermost ends thereof.

* * * * *